United States Patent
Payzer et al.

(10) Patent No.: US 8,510,343 B2
(45) Date of Patent: Aug. 13, 2013

(54) COGENERATION OF DATABASE APPLICATIONS AND THEIR DATABASES

(75) Inventors: Gersh Payzer, Redmond, WA (US);
Stephen Michael Danton, Seattle, WA (US); Noaa Avital, Seattle, WA (US);
Pedro Ardila, Seattle, WA (US);
Stephen J. Millet, Edmonds, WA (US);
John R. Justice, Bellevue, WA (US);
Eric Kenneth Zinda, Seattle, WA (US);
Christopher L. Anderson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 12/813,582

(22) Filed: Jun. 11, 2010

(65) Prior Publication Data

US 2011/0307519 A1 Dec. 15, 2011

(51) Int. Cl.
*G06F 17/30* (2006.01)

(52) U.S. Cl.
USPC ............ 707/802; 707/803; 707/804; 707/805

(58) Field of Classification Search
USPC ................................. 707/802–805
See application file for complete search history.

(56) References Cited

U.S. PATENT DOCUMENTS

| | | | | |
|---|---|---|---|---|
| 7,180,500 B2 * | 2/2007 | Marvit et al. | | 345/156 |
| 7,219,327 B1 | 5/2007 | Jacobs et al. | | |
| 7,301,526 B2 * | 11/2007 | Marvit et al. | | 345/156 |
| 7,301,527 B2 * | 11/2007 | Marvit | | 345/156 |
| 7,301,529 B2 * | 11/2007 | Marvit et al. | | 345/156 |
| 7,365,737 B2 * | 4/2008 | Marvit et al. | | 345/156 |
| 7,467,026 B2 * | 12/2008 | Sakagami et al. | | 700/245 |
| 7,610,308 B1 | 10/2009 | Chiu | | |
| 7,903,084 B2 * | 3/2011 | Marvit et al. | | 345/156 |
| 2003/0033378 A1 | 2/2003 | Needham et al. | | |
| 2004/0001113 A1 * | 1/2004 | Zipperer et al. | | 345/853 |
| 2005/0210418 A1 * | 9/2005 | Marvit et al. | | 715/863 |
| 2005/0212752 A1 * | 9/2005 | Marvit et al. | | 345/156 |
| 2005/0212754 A1 * | 9/2005 | Marvit et al. | | 345/156 |
| 2005/0212756 A1 * | 9/2005 | Marvit et al. | | 345/156 |
| 2005/0212760 A1 * | 9/2005 | Marvit et al. | | 345/156 |

(Continued)

OTHER PUBLICATIONS

"Entity Designer Database Generation Power Pack", Retrieved at << http://blogs.msdn.com/adonet/archive/2010/02/08/entity-designer-database-generation-power-pack.aspx >>, Feb. 8, 2010, pp. 11.

(Continued)

*Primary Examiner* — Frantz Coby
(74) *Attorney, Agent, or Firm* — Ogilvie Law Firm (57) ABSTRACT

User experience in a designer tool manages cogeneration of a database application and a database accessible through the application. A user places a visual representation of an application element designed to control a relational or hierarchical dataset. Code is automatically called to add the application element to the application, and automatically invoked to create database schema elements designed to implement the dataset in the database under application element control. Users verify that an application element has been automatically added, and confirm that database schema elements implementing the dataset(s) under control of the application element have been automatically created. A tutorial illustrates a workflow utilizing a designer tool to cogenerate a database application and a database without a data design step. A wizard utilizes the designer tool to cogenerate a database application and a database that collectively implement a calendar, a diagram, a tree, a wiki, and/or a list.

20 Claims, 3 Drawing Sheets

U.S. PATENT DOCUMENTS

| | | |
|---|---|---|
| 2005/0212767 A1* | 9/2005 | Marvit et al. .................. 345/158 |
| 2005/0278282 A1 | 12/2005 | Sheridan |
| 2006/0020619 A1 | 1/2006 | Netz et al. |
| 2006/0242189 A1 | 10/2006 | Leetaru et al. |
| 2008/0010312 A1 | 1/2008 | Gupta |
| 2008/0109715 A1 | 5/2008 | Stover |
| 2008/0270980 A1 | 10/2008 | Ahadian et al. |
| 2008/0270985 A1 | 10/2008 | McCormack et al. |
| 2011/0187652 A1* | 8/2011 | Huibers ......................... 345/173 |

OTHER PUBLICATIONS

Dactylo., "User Interface generator for ASP.NET database applications", Retrieved at << http://www.codeproject.com/KB/aspnet/UIGenerator.aspx >>, Sep. 17, 2006, pp. 9.

Winters, et al., "Oracle® HTML DB", Retrieved at << http://download.oracle.com/docs/cd/B13789_01/appdev.101/b10992.pdf >>, User's Guide, Release 1.5, Part No. B10992-01, Dec. 2003, pp. 382.

"Database design", Retrieved at << http://en.wikipedia.org/wiki/Database_design >>, no later than May 25, 2010, pp. 6.

"International Search Report", Mailed Date: Feb. 9, 2012, Application No. PCT/US2011/037435, Filed Date: May 20, 2011, pp. 8.

* cited by examiner

COGENERATION OF DATABASE APPLICATIONS AND THEIR DATABASES

BACKGROUND

Databases are widely used to organize data to facilitate operations such as retrieval of individual pieces of data, queries based on multiple pieces of data, and updates to keep data current, for example. Database design often involves creating a detailed data model of a database, in order to specify logical and physical design choices and physical storage parameters. A data model may be written by a database designer in a data definition language, which can then be used to create the database.

Some database designers follow a workflow which determines relationships between data elements in view of a database's purpose, and superimposes a logical structure on data based on those relationships. After deciding what kind of information the database will hold, the database designer manually divides information items into major subjects, such as Products, Employees, Teams, or other subjects, depending on the database's purpose. Each subject may be represented as a table. Each table contains columns representing information stored in the table. For instance, a Products table might include columns such as number-in-stock and price. The designer may assign each table a primary key to uniquely identify each row. For example, an Employee Number might be used as primary key in an Employees table. The designer also considers relationships between the data in different tables, and adds columns to current tables or creates new tables to clarify the relationships, as appropriate. The design can then be refined, until it is ready to be normalized if it was not previously normalized. Data normalization rules help structure tables so that the corresponding implementation will work as planned.

SUMMARY

Various attempts have been made to facilitate database design, but complexities remain a barrier, particularly for people who are not trained and experienced in data model design. Some embodiments described herein provide a user experience for cogenerating a database application and a database that is accessible through the database application. A user gesture in a designer tool user interface places a visual representation of an application element that is designed to control a relatively complex dataset, namely, a relational dataset or a hierarchical dataset, as opposed to the simpler datasets used in forms, for example. Code is automatically called to add the application element to the database application in response to the user gesture, and code is automatically invoked to create database schema element(s) designed to implement the dataset(s) in the database under control of the application element.

For example, in some embodiments the visual representation represents a calendar, the designer tool automatically calls code to add a calendar user interface to the database application, and the designer tool automatically invokes code to create calendar database schema elements designed to implement a calendar relational dataset under control of the calendar user interface. In some embodiments, diagrams, trees, wikis, and/or lists may be similarly cogenerated to implement respective datasets under control of respective user interfaces. Some embodiments display automatically generated SQL code.

Users may verify that an application element has been automatically added to the database, and may confirm that database schema elements implementing the dataset(s) under control of the application element have been automatically created in the database. For example, users may execute the database application without previously manually entering code to add the application element to the database application, and may visually inspect automatically generated code of the database application. Users may also execute the database application without previously manually entering code to create the database schema elements implementing the dataset(s), and may visually inspect code which implements automatically generated database schema elements. Some embodiments include a tutorial which can illustrate a workflow utilizing a designer tool to cogenerate a database application and a database without a data design step, e.g., Placing Visual Representations and then Verifying Application Content and Confirming Database Content. Some embodiments include a wizard which can utilize the designer tool to cogenerate a database application and a database that collectively implement a calendar, a diagram, a tree, a wiki, and/or a list.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

People who are unfamiliar with software development and database design may think of application programs in terms of the visible elements shown on a screen, such as forms, tables, and pages. Some people do not distinguish between "data," something they can't see, and "views," something they can see, although in the software and database development arts these are actually two different things. Some approaches therefore try to make data design more approachable. However, current data design asks users to treat data and views as different things, and as a result some users still struggle to obtain desired results.

Some embodiments described herein provide a user experience that allows people to create database applications without the need for a data design step. Users can build applications with visual elements they understand while software creates the necessary database tables in the background using SQL or the like.

Accordingly, workflows taught here may differ from those used previously. In one familiar data-design-centered approach, work flow proceeded from Instance Data Design to Schema Design to Table Construction to Data Presentation. One workflow for a user building an application taught herein, by contrast, allows a user to start with the Data Presentation by Placing Visual Representations and thus automatically generate the appropriate instance data and schema tables in the database; users may then Execute and/or Visually Inspect the results of such a Data Presentation. Users may cogenerate database applications and corresponding databases which include diagrams, wikis, lists, trees, calendars and other user interface elements, including custom behaviors. Some embodiments generate standard SQL, allowing more knowledgeable users to extend or modify the automatically generated application code.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

"Autogen" means automatically generated.

Throughout this document, use of the optional plural "(s)" means that one or more of the indicated feature is present. For example, "calendar(s)" means "one or more calendars" or equivalently "at least one calendar".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting to", "sending toward", "calling", "invoking", or "communicating with" a destination may involve intervening action such as forwarding, copying, buffering, marshaling, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
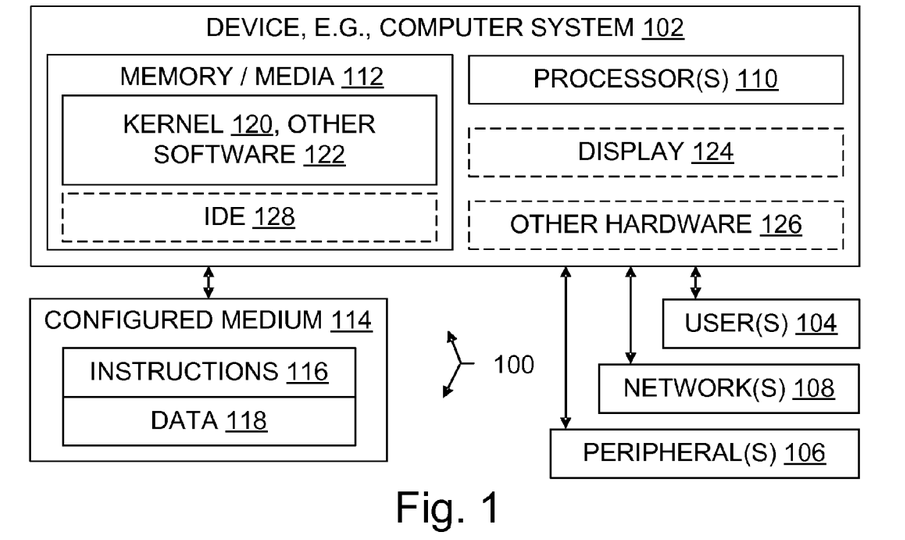
FIG. 1 is a block diagram illustrating a computer system having at least one processor, at least one memory, and other items in an operating environment which may be present on multiple network nodes, and also illustrating configured storage medium embodiments.

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Storage media 112 may be of different physical types. The storage media 112 may be volatile memory, non-volatile memory, fixed in place media, removable media, magnetic media, optical media, and/or of other types of storage media (as opposed to propagated signal media that merely propagates a signal). In particular, a configured storage medium 114 such as a CD, DVD, memory stick, or other removable non-volatile memory medium may become functionally part of the computer system when inserted or otherwise installed, making its content accessible for use by processor 110. The removable configured storage medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by cogeneration as discussed herein, e.g., by coordination, binding, deployment, execution, modification, display, creation, loading, and/or other operations.

A kernel 120, and other software 122 such as applications and utilities, as well as other items shown in the Figures may reside partially or entirely within one or more media 112, thereby configuring those media. An operating environment may also include a display 124, and other hardware 126, such as speakers, buses, power supplies, and accelerators, for instance.

A given operating environment 100 may include an Integrated Development Environment (IDE) 128 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use extensible application environments, collaborative technologies, or both.

Items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
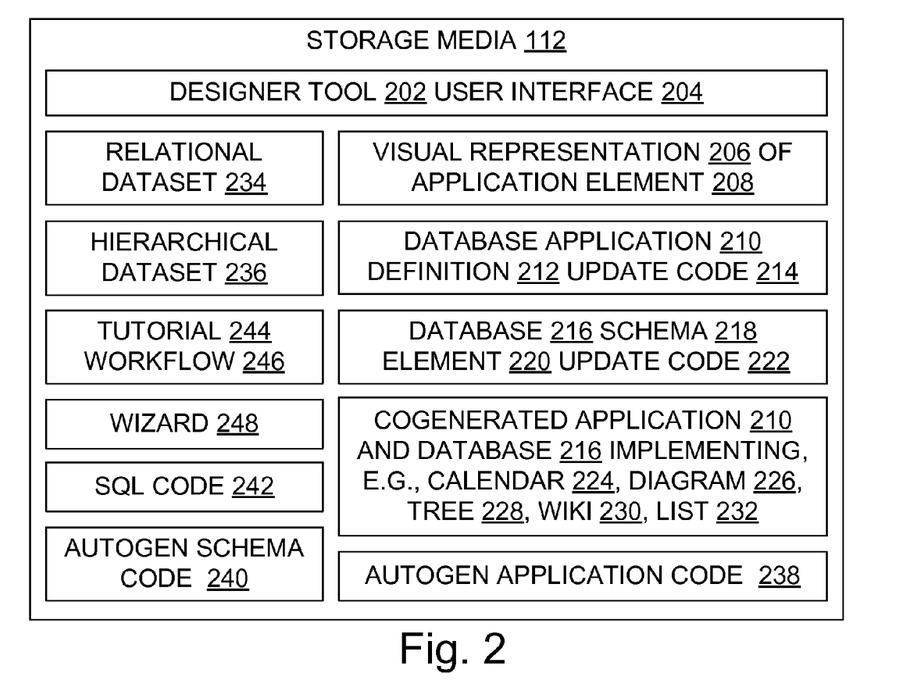
FIG. 2 is a block diagram illustrating aspects of an example architecture for cogeneration of database applications and their databases.

FIG. 2 illustrates aspects of an architecture which is suitable for use with some embodiments. A designer tool 202 has a user interface 204 which receives user gestures, through a keyboard, mouse, touch screen, and/or other peripherals 106, for example. The user interface provides users with access to, and control over, visual representations 206 of database application elements 208, such as representations of calendars, lists, wikis, trees, and diagrams, for example. The database application 210 is defined formally by a definition 212, such as a collection of graph objects and/or other familiar application definition mechanisms. The application definition 212 is managed (e.g., created, modified) by application definition update code 214, such as familiar libraries or utilities for managing application definitions.

A database 216 is defined formally by a schema 218 containing schema elements 220. The schema 218 may be implemented using a data definition language, SQL statements, XML, and/or other familiar schema mechanisms. The schema 218 is managed (e.g., created, modified) by schema update code 222, such as familiar libraries for managing database schemas or a database management system (DBMS).

Some embodiments include an application 210 and database 216 which have been cogenerated through use of the designer tool 202, for example. A cogenerated application 210 and database 216 together as a unit may implement items such as a calendar 224, a diagram 226, a tree 228, a wiki 230, and/or a list 232. Each of the items 224-232 includes both a user interface portion in the application and a database portion in the database schema. The database portion may define a schema for a relational dataset 234, a hierarchical dataset 236, or both. The user interface portion includes automatically generated application code 238, and the database portion includes automatically generated schema code 240. Either or both portions may include automatically generated SQL code 242.

To facilitate use of the designer tool 202, some embodiments provide a tutorial 244 which illustrates visually a workflow 246 that omits data design as an explicit user activity. Some embodiments facilitate use of the designer tool 202 by providing a wizard 248 which prompts the user with scripted choices and controls operation of the designer tool 202 based on the user's responses.

With reference to FIGS. 1 and 2, some embodiments provide a computer system 102 with a logical processor 110 and a memory medium 112 configured by circuitry, firmware, and/or software to transform physical user actions into a selection and arrangement of coordinated application definitions and database schemas as described herein. Some embodiments include a memory 112 in operable communication with the logical processor(s). A designer tool 202 residing in the memory is operable to do several things. The tool can receive in its user interface 204 a user gesture to place a visual representation 206 of an application element 208. The application element 208 is designed to control a relational dataset 234, a hierarchical dataset 236, or both. The tool 202 can automatically call code 214 to add the application element to the database application in response to the user gesture. The tool 202 can also automatically invoke code 222 to create at least one database schema element that is designed to implement in the database the dataset(s) under control of the application element. In response to a user gesture, code may be automatically called or invoked immediately, or it may be called or invoked later, such as during an explicit save step or after other processing occurs.

As an example, some embodiments cogenerate database tables for a list 232. Assume a user wants to add a task list to a team webpage. The user is not trained in, or does not wish to presently get sidetracked into, the incidental complexity of tables, views and other database concepts. Some embodiments allow the user can focus on visual elements that are easier to manage. To create the task list, the user adds a blank list to the team webpage, e.g., by dragging a blank list visual icon onto the page's workspace in the designer tool 202. Behind the scenes, the designer tool invokes code 222 to generate a SQL table that provides the backend store for the items in the task list. Next, the user decides to add some columns, showing the task name, who the task is assigned to ("Assigned To"), and the task due date. Through the designer tool's user interface 204 the user places representations 206 of these additional columns. The designer tool invokes code 222 that issues SQL statements to add those columns. Finally, the user decides the Assigned To column should be a separate list of people on the team. The user selects the Assigned To column and uses a user interface 204 gesture to split that column into a new list, e.g., with a combination of tooltip or pop-up menus and mouse dragging, or with a special command key sequence. The designer tool invokes code 222 that issues the SQL statements to create a new table, copy the Assigned To column into the new table, then delete the Assigned To column from the original table.

Some embodiments include a tutorial 244 residing in the memory. The tutorial can be run to illustrate a workflow 246 that utilizes the designer tool 202 to cogenerate a database application and a database without a data design step. The designer tool may run under the tutorial's control while the tutorial illustrates the workflow, but some tutorials simply run recorded and/or simulated illustrations, during which the designer tool 202 is not executing.

Some embodiments include a wizard 248 residing in the memory. The wizard can be run to utilize the designer tool 202 to cogenerate a database application and a database. Unlike the tutorial, the tool 202 normally executes whenever the wizard is running. In some embodiments, the wizard accepts user choices and runs the tool to cogenerate an application 210 and database 216 that collectively implement one or more of the following: a calendar 224, a diagram 226, a tree 228, a wiki 230, a list 232.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104, e.g., during testing.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
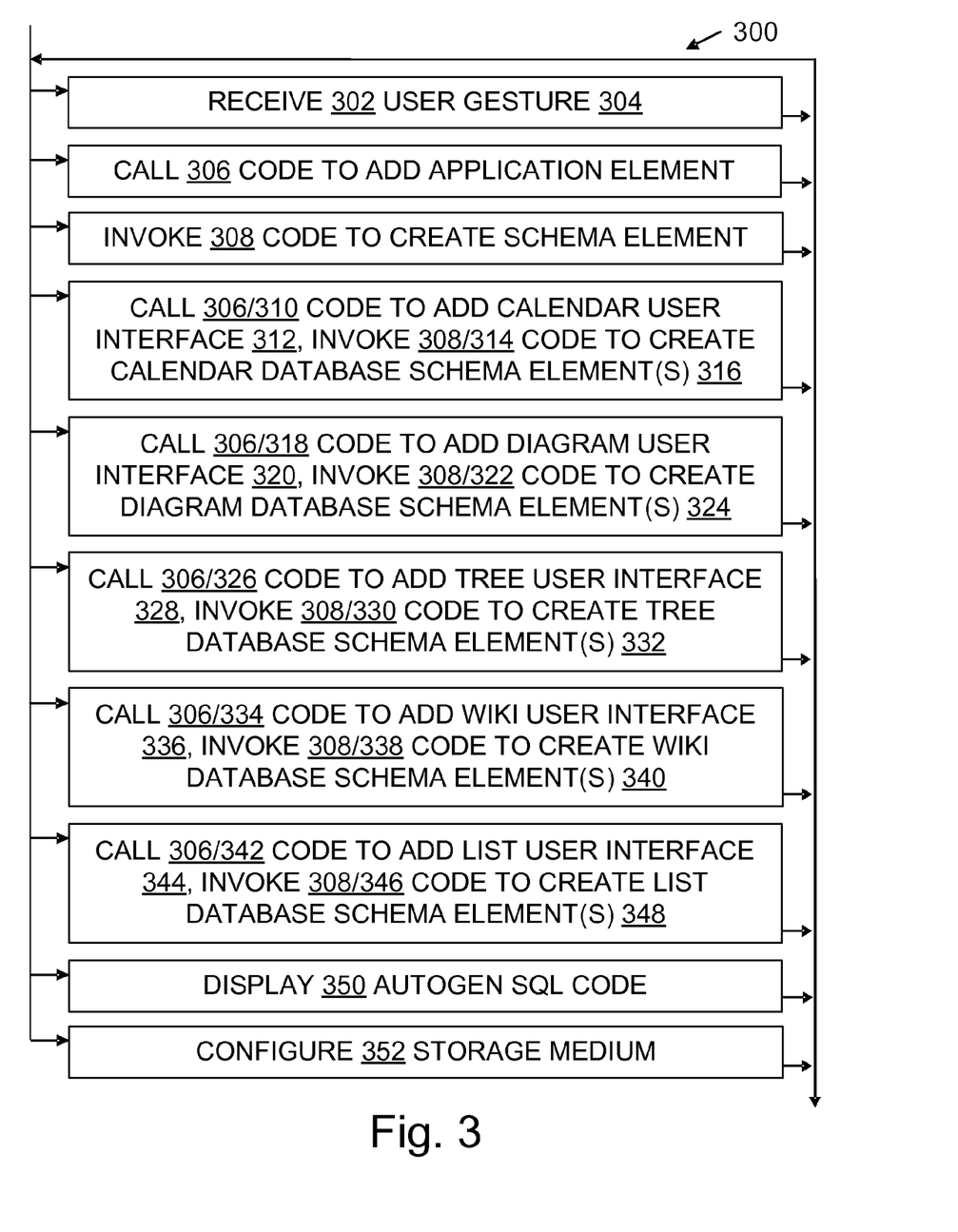
FIG. 3 is a flow chart illustrating steps of some process and configured storage medium embodiments, from a cogeneration-facilitating designer tool perspective.
Figure 4:
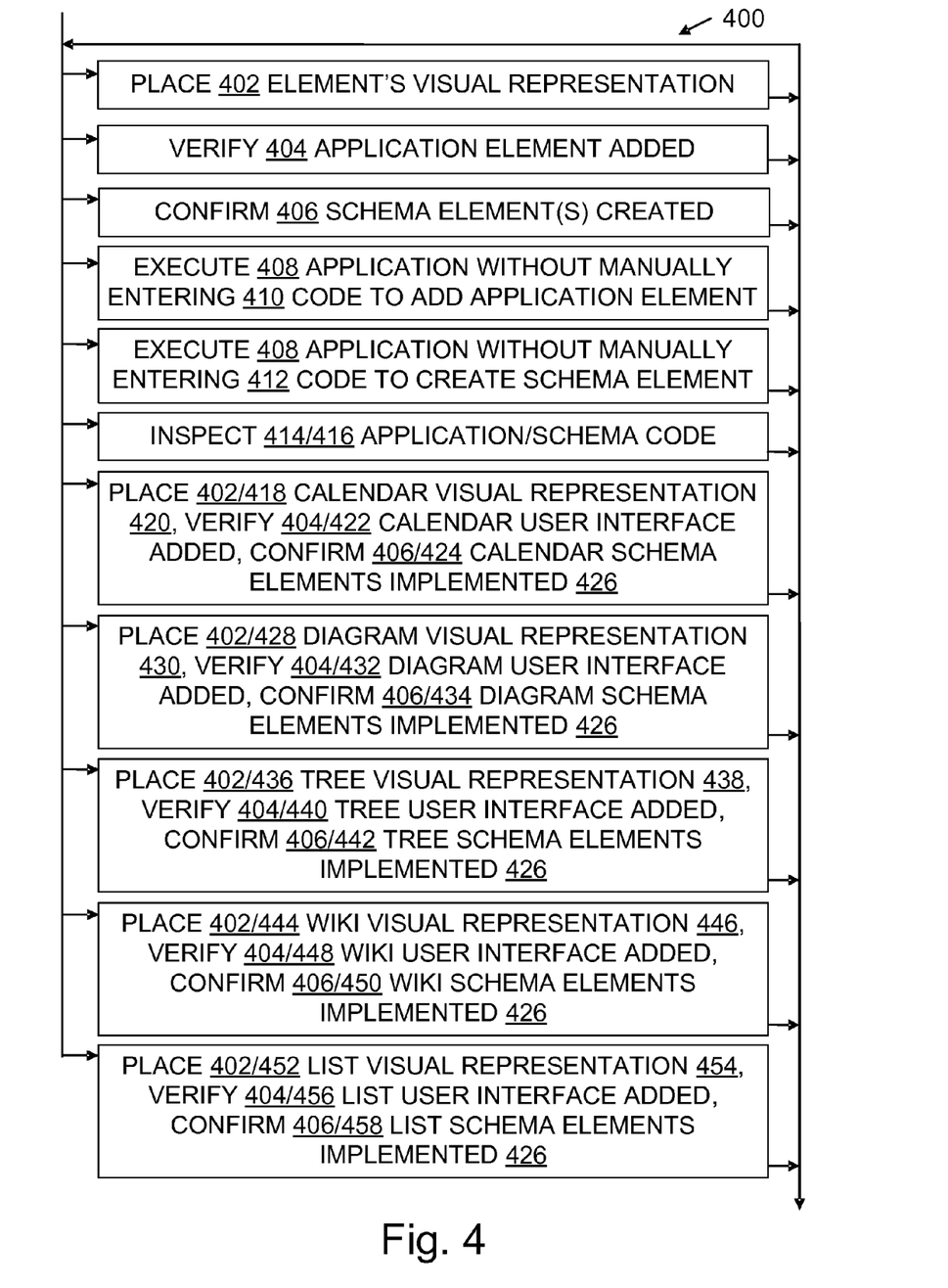
FIG. 4 is a flow chart illustrating steps of some process and configured storage medium embodiments, from a user perspective.

FIGS. 3 and 4 illustrate some process embodiments in flowcharts 300 and 400. Processes shown in the Figures may be performed in some embodiments automatically, e.g., by a designer tool 202 under control of a script requiring little or no current user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in the Figures. Steps may be performed serially, in a partially overlapping manner, or fully in parallel. The order in which a flowchart is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During an input receiving step 302 shown in FIG. 3, an embodiment receives a user gesture 304 as input in a user interface 204 of a cogeneration-capable designer tool 202. Step 402 may be accomplished using familiar user interface mechanisms adapted to present and place visual representations 206 of application elements 208, for example.

During an application element adding call step 306, an embodiment calls code 214 to update an application definition 212 to add or otherwise update the status of an application element 208, such as a calendar, diagram, tree, wiki, or list user interface element, for example. Familiar code for updating application definitions may be called using familiar calling mechanisms, adapted to make the call(s) in response to placement of visual representations 206 by received 302 user gestures, for example, and in coordination with a step 308.

During a schema element creating invocation step 308, an embodiment invokes code 222 to manage a database schema 218 to create or otherwise update the status of a schema element 220, such as a calendar, diagram, tree, wiki, or list schema element, for example. Familiar code for updating schema definitions may be called using familiar invocation mechanisms, adapted to make the invocation(s) in response to placement of visual representations 206 by received 302 user gestures, for example, and in coordination with a step 306.

Different verbs "calling" and "invoking" (and corresponding nouns "call", "invocation", etc.) are used herein for convenience in referring to step 306 or step 308 respectively. However, it will be understood that the calling mechanism and the invocation mechanism may be the same runtime mechanism, albeit with different parameters and different functions, methods, procedures, and/or other routines, in a particular embodiment.

As an example of coordinated cogeneration steps 306 and 308, during a calling step 306, 310 an embodiment calls code 214 to add a calendar user interface 312, in coordination with an invoking step 308, 314 in which the embodiment invokes code 222 to create corresponding calendar element(s) 316 of a database 216 schema. The calendar schema elements 316 are designed to be controlled through user input to the calendar user interface 312 of the application 210.

In this calendar example and four other examples provided below, the coordinated steps 306 and 308 may occur in the order step 306 then step 308, in the order step 308 then step 306, or in an overlapping or simultaneous order. The steps 306 and 308 are coordinated in that they each occur in response to a particular receipt 302 of a particular visual representation 206, and hence each of the steps 306 and 308 in a given example pertains to a particular kind of application element implementation, e.g., a calendar, diagram, tree, wiki, or list. In each example, a familiar corresponding user interface 312, 320, 328, 336, 344 may be used, in coordination with a respective familiar schema element 316, 324, 332, 340, 348.

As another example of coordinated cogeneration steps 306 and 308, during a calling step 306, 318 an embodiment calls code 214 to add a diagram user interface 320, in coordination with an invoking step 308, 322 in which the embodiment invokes code 222 to create corresponding diagram element(s) 324 of a database 216 schema. The diagram schema elements 324 are designed to be controlled through user input to the diagram user interface 320 of the application 210.

As another example of coordinated cogeneration steps 306 and 308, during a calling step 306, 326 an embodiment calls code 214 to add a tree user interface 328, in coordination with an invoking step 308, 330 in which the embodiment invokes code 222 to create corresponding tree element(s) 332 of a database 216 schema. The tree schema elements 332 are designed to be controlled through user input to the tree user interface 328 of the application 210.

As another example of coordinated cogeneration steps 306 and 308, during a calling step 306, 334 an embodiment calls code 214 to add a wiki user interface 336, in coordination with an invoking step 308, 338 in which the embodiment invokes code 222 to create corresponding wiki element(s) 340 of a database 216 schema. The wiki schema elements 340 are designed to be controlled through user input to the wiki user interface 336 of the application 210.

As an example of coordinated cogeneration steps 306 and 308, during a calling step 306, 342 an embodiment calls code 214 to add a list user interface 344, in coordination with an invoking step 308, 346 in which the embodiment invokes code 222 to create corresponding list element(s) 348 of a database 216 schema. The list schema elements 348 are designed to be controlled through user input to the list user interface 344 of the application 210.

During a SQL code displaying step 350, an embodiment displays automatically generated SQL code 242, on a display 124, in a printout, or in another human-perceptible form.

During a memory configuring step 352, a memory medium 112 is configured by a designer tool 202, a tool 202 user interface 204, a tool 202 tutorial 244, a tool 202 wizard 248, and/or otherwise in connection with cogeneration of a database and a database application as discussed herein.

During a placing step 402 shown in FIG. 4, a user of an embodiment places a visual representation 206 of an application element (which also serves in effect as a visual representation of corresponding schema element(s) 220) somewhere in a workspace of a designer tool 202. The placement 402 indicates a particular kind of application item, such as a calendar, diagram, tree, wiki, or list. The placement 402 may also indicate a particular location for the placed item to appear within a completed application 210, such as the bottom right corner of a window, or within a menu titled "widgets", for example. Placing step 402 may be accomplished by inputting user gesture(s) 304 into a designer tool 202 user interface 204.

During an application element added verifying step 404, a user verifies that an application element, such as a user interface 312, 320, 328, 336, or 344, has been added to an application definition 212. For example, the user may visually inspect 414 automatically generated ("autogen") application 210 code 238, using a word processor or a special-purpose code editor. Alternately, or in addition, the user may verify 404 the addition of autogen code 238 by executing 408 the application 210 without having manually entered 410 the interface code that provides the particular added calendar, wiki, etc. functionality shown to be present during execution 408.

During a schema element added confirming step 406, a user confirms that a database schema element, such as schema element(s) to support an interface 312, 320, 328, 336, or 344, are present in a schema 218. For example, the user may visually inspect 416 automatically generated ("autogen") schema code 240, using a word processor or a special-purpose code editor. Alternately, or in addition, the user may confirm 406 the addition of autogen code 240 by executing 408 the application 210 without having manually entered 412 the schema code that provides the particular added calendar, wiki, etc. functionality shown to be present during execution 408.

As an example, during a placing step 402, 418 an embodiment user places a calendar visual representation 420. The user then verifies 404, 422 that a calendar user interface 312 has been added and also confirms 406, 424 that a corresponding calendar schema element 316 has been created. The user accordingly determines that calendar schema element(s) 316 and calendar user interface(s) 312 collectively implement 426 a calendar 224 in the application 210.

As another example, during a placing step 402, 428 an embodiment user places a diagram visual representation 430. The user then verifies 404, 432 that a diagram user interface 320 has been added and also confirms 406, 434 that a corresponding diagram schema element 324 has been created. The user accordingly determines that diagram schema element(s) 324 and diagram user interface(s) 320 collectively implement 426 a diagram 226 in the application 210.

As another example, during a placing step 402, 436 an embodiment user places a tree visual representation 438. The user then verifies 404, 440 that a tree user interface 328 has been added and also confirms 406, 442 that a corresponding tree schema element 332 has been created. The user accordingly determines that tree schema element(s) 332 and tree user interface(s) 328 collectively implement 426 a tree 228 in the application 210.

As another example, during a placing step 402, 444 an embodiment user places a wiki visual representation 446. The user then verifies 404, 448 that a wiki user interface 336 has been added and also confirms 406, 450 that a corresponding wiki schema element 340 has been created. The user accordingly determines that wiki schema element(s) 340 and wiki user interface(s) 336 collectively implement 426 a wiki 230 in the application 210.

As another example, during a placing step 402, 452 an embodiment user places a list visual representation 454. The user then verifies 404, 456 that a list user interface 344 has been added and also confirms 406, 458 that a corresponding list schema element 348 has been created. The user accordingly determines that list schema element(s) 348 and list user interface(s) 344 collectively implement 426 a list 232 in the application 210.

The foregoing steps and their interrelationships are discussed further below, in connection with various embodiments.

Some embodiments provide a process for cogenerating a database application 210 and a database 216 accessible through the database application. The process includes receiving 302 in a user interface a user gesture to place a visual representation of an application element. Although the process can be used in conjunction with other processes which generate databases from visual forms, the present process supports cogeneration for items that have a more complex structure than forms, in that the application element is designed to control a relational dataset and/or a hierarchical dataset rather than a simple table. The process automatically calls 306 code to add the application element to the database application in response to the user gesture, and automatically invokes 308 code to create at least one database schema element that is designed to implement in the database the dataset(s) under control of the application element.

In one variation, for example, the visual representation represents a calendar 224, the calling step automatically calls 310 code to add a calendar user interface to the database application, and the invoking step automatically invokes 314 code to create calendar database schema elements designed to implement a calendar relational dataset under control of the calendar user interface.

In another variation, the visual representation represents a diagram 226, the calling step automatically calls 318 code to add a diagram user interface to the database application, and the invoking step automatically invokes 322 code to create diagram database schema elements designed to implement a diagram relational dataset under control of the diagram user interface. In some embodiments, a diagram hierarchical dataset is an implementation target. For example, an organizational chart can be represented in a user interface as a diagram. That is, diagrams can show hierarchical data as well as relational data.

In another variation, the visual representation represents a tree 228, the calling step automatically calls 326 code to add a tree user interface to the database application, and the invoking step automatically invokes 330 code to create tree database schema elements designed to implement a tree hierarchical dataset under control of the tree user interface. It will be appreciated that most relational datasets can be represented in trees as well. For instance, an organization structure of managers and reports can be thought of as relational data. However, it is not unusual for a user to want to view an organizational structure in a tree.

In another variation, the visual representation represents a wiki 230, the calling step automatically calls 334 code to add a wiki user interface to the database application, and the invoking step automatically invokes 338 code to create wiki database schema elements designed to implement at least one of the following under control of the wiki user interface: a tree hierarchical dataset, a tree relational dataset.

In another variation, the visual representation represents a list 232, the calling step automatically calls 342 code to add a list user interface to the database application, and the invoking step automatically invokes 346 code to create list database schema elements designed to implement a list relational dataset under control of the list user interface.

In some embodiments, the process also displays 350 automatically generated SQL code 242.

Turning to the user perspective, some embodiments provide a process for cogenerating a database application and a database accessible through the database application, the process utilizing a client device which has at least one logical processor in operable communication with at least one memory. The process includes placing 402 in a user interface a visual representation of an application element that is designed to control at least one of the following datasets: a relational dataset, a hierarchical dataset. The process also includes verifying 404 that the application element has been automatically added to the database application in response to the placing step, and confirming 406 that database schema elements implementing the dataset(s) under control of the application element have been automatically created in the database in response to the placing step.

In some embodiments, the verifying step includes executing 408 the database application without previously manually entering code to add the application element to the database application. In some, the verifying step includes visually inspecting 414 automatically generated code of the database application.

In some embodiments, the confirming step includes executing 408 the database application without previously manually entering code to create the database schema elements implementing the dataset(s). In some, the confirming step includes visually inspecting 416 code which implements automatically generated database schema elements.

As a particular example, in some embodiments the placing step places 418 a visual representation of a calendar, the verifying step verifies 422 that a calendar user interface has been added to the database application, and the confirming step confirms 424 that calendar database schema elements under control of the calendar user interface have been implemented in the database.

As another particular example, in some embodiments the placing step places 428 a visual representation of a diagram, the verifying step verifies 432 that a diagram user interface has been added to the database application, and the confirming step confirms 434 that diagram database schema elements under control of the diagram user interface have been implemented in the database.

As another particular example, in some embodiments the placing step places 436 a visual representation of a tree, the verifying step verifies 440 that a tree user interface has been added to the database application, and the confirming step confirms 442 that tree database schema elements under control of the tree user interface have been implemented in the database.

As another particular example, in some embodiments the placing step places 444 a visual representation of a wiki, the verifying step verifies 448 that a wiki user interface has been added to the database application, and the confirming step confirms 450 that wiki database schema elements under control of the wiki user interface have been implemented in the database.

As another particular example, in some embodiments the placing step places 452 a visual representation of a list, the verifying step verifies 456 that a list user interface has been added to the database application, and the confirming step confirms 458 that list database schema elements under control of the list user interface have been implemented in the database.

Configured Media

Some embodiments include a configured computer-readable storage medium 112. Storage medium 112 may include disks (magnetic, optical, or otherwise), RAM, EEPROMS or other ROMs, and/or other configurable memory, including in particular computer-readable media and excluding propagated signal media. The storage medium which is configured may be in particular a removable storage medium 114 such as a CD, DVD, or flash memory. A general-purpose memory, which may be removable or not, and may be volatile or not, can be configured into an embodiment using items such as designer tools 202, tool 202 tutorials 244, and/or tool 202 wizards 248, in the form of data 118 and instructions 116, read from a removable medium 114 and/or another source such as a network connection, to form a configured medium. The configured storage medium 112 is capable of causing a computer system to perform process steps for transforming data through cogeneration as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a process for cogenerating a database application and a database accessible through the database application, the process comprising the steps of:

placing a visual representation of an application element that is designed to control at least one of the following datasets: a relational dataset, a hierarchical dataset;

automatically calling code to add the application element to the database application in response to the placing step; and automatically invoking code to create at least one database schema element that is designed to implement in the database the dataset(s) under control of the application element.

2. The configured computer-readable storage medium of claim 1, wherein the visual representation represents a calendar, the calling step automatically calls code to add a calendar user interface to the database application, and the invoking step automatically invokes code to create calendar database schema elements designed to implement a calendar relational dataset under control of the calendar user interface.

3. The configured computer-readable storage medium of claim 1, wherein the visual representation represents a diagram, the calling step automatically calls code to add a diagram user interface to the database application, and the invoking step automatically invokes code to create diagram database schema elements designed to implement a diagram relational dataset under control of the diagram user interface.

4. The configured computer-readable storage medium of claim 1, wherein the visual representation represents a tree, the calling step automatically calls code to add a tree user interface to the database application, and the invoking step automatically invokes code to create tree database schema elements designed to implement a tree hierarchical dataset under control of the tree user interface.

5. The configured computer-readable storage medium of claim 1, wherein the visual representation represents a wiki, the calling step automatically calls code to add a wiki user interface to the database application, and the invoking step automatically invokes code to create wiki database schema elements designed to implement at least one of the following under control of the wiki user interface: a tree hierarchical dataset, a tree relational dataset.

6. The configured computer-readable storage medium of claim 1, wherein the visual representation represents a list, the calling step automatically calls code to add a list user interface to the database application, and the invoking step automatically invokes code to create list database schema elements designed to implement a list relational dataset under control of the list user interface.

7. The configured computer-readable storage medium of claim 1, wherein the process further comprises receiving in a user interface a user gesture to place the visual representation; and displaying automatically generated SQL code.

8. A process for cogenerating a database application and a database accessible through the database application, the process utilizing a client device which has at least one logical processor in operable communication with at least one memory, the process comprising the steps of:

placing in a user interface a visual representation of an application element that is designed to control at least one of the following datasets: a relational dataset, a hierarchical dataset;

verifying that the application element has been automatically added to the database application in response to the placing step; and confirming that database schema elements implementing the dataset(s) under control of the application element have been automatically created in the database in response to the placing step.

9. The process of claim 8, wherein the verifying step comprises executing the database application without previously manually entering code to add the application element to the database application.

10. The process of claim 8, wherein the verifying step comprises visually inspecting automatically generated code of the database application.

11. The process of claim 8, wherein the confirming step comprises executing the database application without previously manually entering code to create the database schema elements implementing the dataset(s).

12. The process of claim 8, wherein the confirming step comprises visually inspecting code which implements automatically generated database schema elements.

13. The process of claim 8, wherein the placing step places a visual representation of a calendar, the verifying step verifies that a calendar user interface has been added to the database application, and the confirming step confirms that calendar database schema elements under control of the calendar user interface have been implemented in the database.

14. The process of claim 8, wherein the placing step places a visual representation of a diagram, the verifying step verifies that a diagram user interface has been added to the database application, and the confirming step confirms that diagram database schema elements under control of the diagram user interface have been implemented in the database.

15. The process of claim 8, wherein the placing step places a visual representation of a tree, the verifying step verifies that a tree user interface has been added to the database application, and the confirming step confirms that tree database schema elements under control of the tree user interface have been implemented in the database.

16. The process of claim 8, wherein the placing step places a visual representation of a wiki, the verifying step verifies that a wiki user interface has been added to the database application, and the confirming step confirms that wiki database schema elements under control of the wiki user interface have been implemented in the database.

17. The process of claim 8, wherein the placing step places a visual representation of a list, the verifying step verifies that a list user interface has been added to the database application, and the confirming step confirms that list database schema elements under control of the list user interface have been implemented in the database.

18. A computer system comprising:

at least one logical processor;

a memory in operable communication with the logical processor(s);

a designer tool residing in the memory and operable to do the following:

receive in a user interface a user gesture to place a visual representation of an application element that is designed to control at least one of the following datasets: a relational dataset, a hierarchical dataset;

automatically call code to add the application element to the database application in response to the user gesture; and automatically invoke code to create at least one database schema element that is designed to implement in the database the dataset(s) under control of the application element.

19. The system of claim 18, further comprising a tutorial residing in the memory and operable to illustrate a workflow utilizing the designer tool to cogenerate a database application and a database without a data design step.

20. The system of claim 18, further comprising a wizard residing in the memory and operable to utilize the designer tool to cogenerate a database application and a database which collectively implement at least one of the following: a calendar, a diagram, a tree, a wiki, a list.

* * * * *